US010645341B1

(12) United States Patent
Noland et al.

(10) Patent No.: US 10,645,341 B1
(45) Date of Patent: May 5, 2020

(54) THREE-WAY VIDEO VISITATION DETECTION USING VIDEO CUES

(71) Applicant: Securus Technologies, Inc., Carrollton, TX (US)

(72) Inventors: Alexander Noland, North Richland Hills, TX (US); John Wange, Dallas, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/849,353

(22) Filed: Dec. 20, 2017

(51) Int. Cl.
*H04N 7/15* (2006.01)
*G06K 9/00* (2006.01)

(52) U.S. Cl.
CPC ........... *H04N 7/15* (2013.01); *G06K 9/00711* (2013.01)

(58) Field of Classification Search
CPC .. H04M 3/2281; H04M 3/4222; H04M 3/568; H04M 3/10; H04M 1/656; H04M 2201/40; H04M 2201/5081; H04N 7/15; H04N 7/152; H04L 65/1003; H04L 12/1807; H04L 65/4038; H04L 12/1818
USPC .......................... 348/14.01–14.16; 379/88.01
See application file for complete search history.

(56) References Cited

U.S. PATENT DOCUMENTS

| | | | | |
|---|---|---|---|---|
| 2008/0129816 A1* | 6/2008 | Mattila | ................... | H04L 12/66 348/14.08 |
| 2010/0254569 A1* | 10/2010 | Vial | ...................... | G06T 1/0071 382/100 |
| 2014/0278399 A1* | 9/2014 | Rodman | ............... | H04M 3/568 704/233 |
| 2015/0003608 A1* | 1/2015 | Ansari | ..................... | G09C 5/00 380/201 |
| 2015/0207927 A1* | 7/2015 | Torgersrud | ............. | H04M 3/38 379/88.02 |
| 2016/0212259 A1* | 7/2016 | Higgs | ................. | H04M 3/2281 |
| 2016/0315988 A1* | 10/2016 | Lyons | .................. | H04L 65/602 |
| 2017/0006159 A1* | 1/2017 | Olligschlaeger | .... | H04M 3/2281 |
| 2017/0094053 A1* | 3/2017 | Hogg, Jr. | ............ | H04M 3/2281 |
| 2017/0149962 A1* | 5/2017 | Hodge | ................. | H04M 17/01 |
| 2017/0318143 A1* | 11/2017 | Hodge | .................. | H04B 11/00 |
| 2018/0007194 A1* | 1/2018 | Hodge | ................. | H04M 17/01 |
| 2019/0014062 A1* | 1/2019 | Hodge | ................. | H04L 51/043 |

\* cited by examiner

*Primary Examiner* — Melur Ramakrishnaiah
(74) *Attorney, Agent, or Firm* — Fogarty LLP (57) ABSTRACT

Systems and methods are disclosed for establishing a video conferencing session between a first device and a second device; extracting video information from video conferencing session data received from the second device; and identifying one or more known cues that have been added to the video information, wherein the known cues identify a third device as a source of the video conferencing session data. The systems and methods may add cues to outbound video information prior to transmission as video conferencing session data, wherein the added cues identify the first device as a source of the transmitted video conferencing session data. The systems and methods may generate an alert and/or terminate the video conferencing session and/or flag a video conferencing session record for further analysis when a known cue has been identified in the video information.

17 Claims, 5 Drawing Sheets

THREE-WAY VIDEO VISITATION DETECTION USING VIDEO CUES

BACKGROUND

Traditionally, jails and prisons have allowed inmates to contact friends and family via letters and telephone calls. However, friends and family were required to visit the facility to see an inmate in-person. More recently, jails and prisons have provided other visitation methods, such as videoconferences (video visitation) and online chat sessions, that allow inmates to have real-time contact with remote friends and family. Prior to allowing an inmate to contact someone outside the facility, jail or prison staff must first verify that the remote party is on the inmate's approved contact list. This is to prevent inmates from communicating with unauthorized individuals, such as gang members, or protected people, such as victims, witnesses, or court staff. However, because the jail or prison does not have control over the remote friend or family member, an authorized contact may improperly reroute inmate communications to unapproved contacts, such as by call forwarding, conference calling, or videoconferencing.

SUMMARY

The present invention is directed to preventing unauthorized inmate to inmate communications. In an example embodiment, systems and methods comprise establishing a video conferencing session between a first device and a second device; extracting video information from video conferencing session data received from the second device; and identifying one or more known cues that have been added to the video information, wherein the known cues identify a third device as a source of the video conferencing session content. The systems and methods may add cues to outbound video information prior to transmission as video conferencing session data, wherein the added cues identify the first device as a source of the transmitted video conferencing session content.

The systems and methods may generate an alert and/or terminate the video conferencing session and/or flag a video conferencing session record for further analysis when a known cue has been identified in the video information. The systems and methods may also remove the known cues from the video information, and display the video information without the known cues to a user so that the user does not detect the cue.

The known cue may or may not be detectable by human vision. The known cue may be a pattern of light flashes or screen blinking. The known cue may occur at regular, irregular, or random intervals.

In another example embodiment, systems and methods comprise establishing a video conferencing session between a first device and a second device; extracting video information from video conferencing session data received from the second device; and identifying one or more known cues that have been added to the video information, wherein the known cues originated at the first device. The systems and methods may add the known cues to outbound video information at the first device prior to transmission as video conferencing session data.

In further embodiment, a video conferencing system comprises inbound video circuitry configured to extract video information from received video conferencing session data; and video analysis circuitry configured to identify known cues that have been added to the video information, wherein the known cues identify a source of the received video conferencing session content. The video conferencing system may further comprise outbound video circuitry configured to add cues to outbound video information prior to transmission as video conferencing session data, wherein the added cues identify a source of the transmitted video conferencing session content.

The video conferencing system may further comprise an alert system configured to perform one or more of: generating an alert when a known cue has been identified in the video information; terminating the video conferencing session when a known cue has been identified in the video information; and flagging a video conferencing session record for further analysis when a known cue has been identified in the video information.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

As used herein, the term "controlled-environment facility" refers to any location for which there are restrictions on who can enter or leave. Additionally, there may be restrictions on what personal property, if any, is allowed within a controlled-environment facility. There are various types of controlled-environment facilities and people may be voluntary or involuntary residents of such facilities, whether temporarily or permanently. For example, controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, schools, dormitories, barracks, etc.), and the like. As used herein, the term "resident" as applied to a controlled-environment facility refers to any person within such facilities voluntarily or involuntarily and temporarily or permanently. For example, residents may include inmates, prisoners, guards, and staff in correctional institutions, patients, doctors, nurses, and other medical staff in healthcare facilities, and students, teachers, and counselors in restricted living quarters.

For convenience of explanation, the various examples discussed herein are presented in the context of correctional facilities or the like. For instance, in some of the embodiments discussed below, a controlled-environment facility may be referred to as a correctional facility, jail, or prison, and its residents may be referred to as inmates, prisoners, arrestees, or detainees. It should be understood, however, that the systems and methods described herein may be similarly applicable to other types of controlled-environment facilities and their respective residents.

Figure 1:
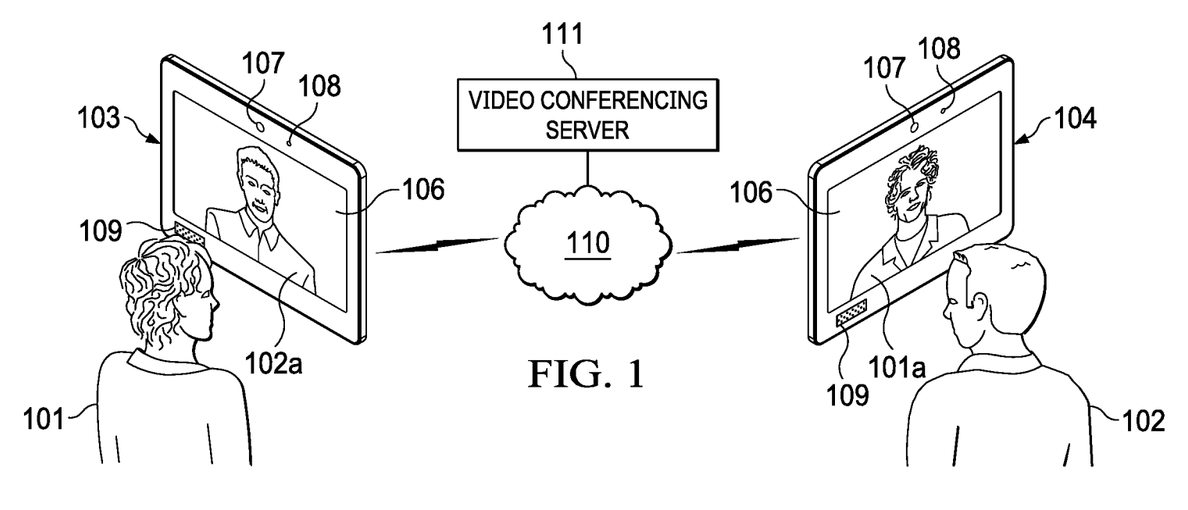
FIG. 1 is simplified block diagram illustrating two individuals participating in a video conferencing or video chat session.

FIG. 1 is simplified block diagram illustrating two individuals 101, 102 participating in a video conferencing session. As used herein, the term video conference will be understood to refer to any live, visual connection between two or more people for the purpose of communication including, without limitation, video visitation, video chat, teleconference, or webinar. Participant 101 uses communication device 103, and participant 102 uses communication device 104. Devices 103, 104 may be the same or different types of devices. Devices 103, 104 may be, for example, a tablet, laptop, or desktop computer, smartphone, or a specialized video conferencing terminal, kiosk, or workstation. Generally, devices 103, 104 have a screen 106 that displays video or still images captured by camera 107 on the other device. During a video conferencing session, for example, an image 102a of participant 102 is displayed to user 101 on device 103. Similarly, an image 101a of participant 101 is displayed to user 102 on device 104. Audio is captured via microphone 108 on each device, and then broadcast to the participant on the other device over speaker 109. The video conferencing session may be controlled by applications running on each device 103, 104. Video conferencing data is exchanged through one or more networks 110 that are in communication with devices 103, 104. Network 110 may be, for example, one or more of a wireless carrier network, landline telephone network, the Internet, an intranet, a wireless or wired Local Area Network (LAN), an enterprise network, and the like. A video conferencing server 111 may be used to facilitate setting up, initiating, and managing video conference sessions. Video conference server 111 may be centrally located or may be co-located with one of participant devices 103, 104. Each participant 101, 102 and their respective device 103, 104 may be located anywhere that provides access to network 110, which may be near to or remote from the other participant. In a typical video conference, an initiating participant 101 at device 103 calls the other participant 102's device 104 and, therefore, knows which device 104 is connected to the session.

Figure 2:
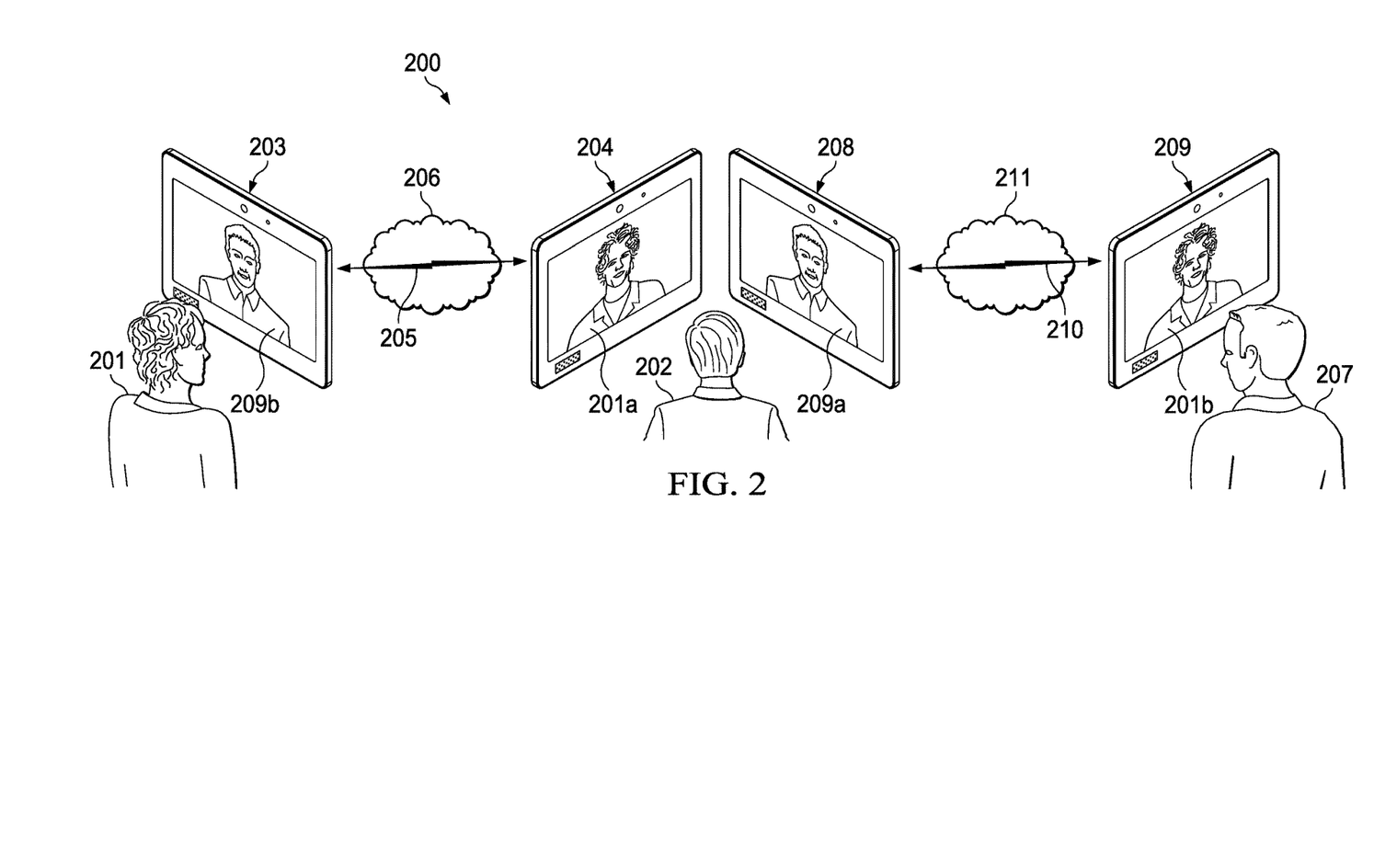
FIG. 2 is simplified block diagram illustrating a scenario in which two video conferencing sessions are manually linked together in a three-way video conferencing session.

FIG. 2 is simplified block diagram illustrating a scenario in which two video conferencing or video chat sessions are manually linked together in a three-way video conferencing session 200. Participants 201, 202 use communication devices 203, 204 to establish a video conferencing session 205 across network 206. While videoconferencing session 205 is active, participants 202, 207 use communication devices 208, 209 to establish a video conferencing session 210 across network 211. Networks 206 and 211 may include the same or different networks. In the scenario illustrated in FIG. 2, participant 202 may or may not actively join video conferencing sessions 205, 210. Participant 202's key role in this scenario is to hold devices 204 and 208 in a face-to-face manner so that video and audio broadcast on one device is captured on the other and vice versa. This allows, for example, video displayed on device 204 to be captured by a camera on device 208 and audio broadcast by device 204 to be captured by a microphone on device 208. The net effect is to relay the video and audio that initiates at endpoints 203, 209 to the other endpoint. Videoconferencing sessions 205 and 211 may be established in any chronological order (e.g., simultaneously, or either session established first) and may be initiated by any party (e.g., participant 202 may establish both sessions by contacting both other parties, or endpoint participants 201, 207 may establish individual sessions by both contacting middleman participant 202, or some other sequence).

As illustrated in FIG. 2, device 203 captures video of participant 201 as part of videoconferencing session 205, which is then displayed as image 201a on device 204. Device 208 then captures video of image 201a as part of videoconferencing session 210, which is then displayed as image 201b on device 209. Similarly, video of participant 207 is displayed as image 209a on device 208 and then captured and relayed to device 203 as image 209b. Audio is relayed between devices 203 and 209 in a similar manner. Even though participants 201 and 207 have not directly contacted each other, they are able to communicate directly via linked video conferencing sessions. As a result, it would not be readily apparent to either endpoint devices 203, 209, networks 206, 211, or any related video conferencing servers or equipment that participants have created this three-way video conferencing session. This may a be problem in certain environments, such as in controlled-environment facilities, in which video conference participants 201 are only allowed to communicate with specific individuals (i.e., a whitelist) and/or are not allowed to communicate with other individuals (i.e., a blacklist). Three-way video conferencing session 200 allows participant 201 to avoid most protections that are in place to prevent unauthorized contact with participant 207. This three-way communication can be particularly problematic if the endpoint participants 201, 207 are both residents of controlled-environment facilities that are not allowed to communicate either unsupervised or at all.

Figure 3:
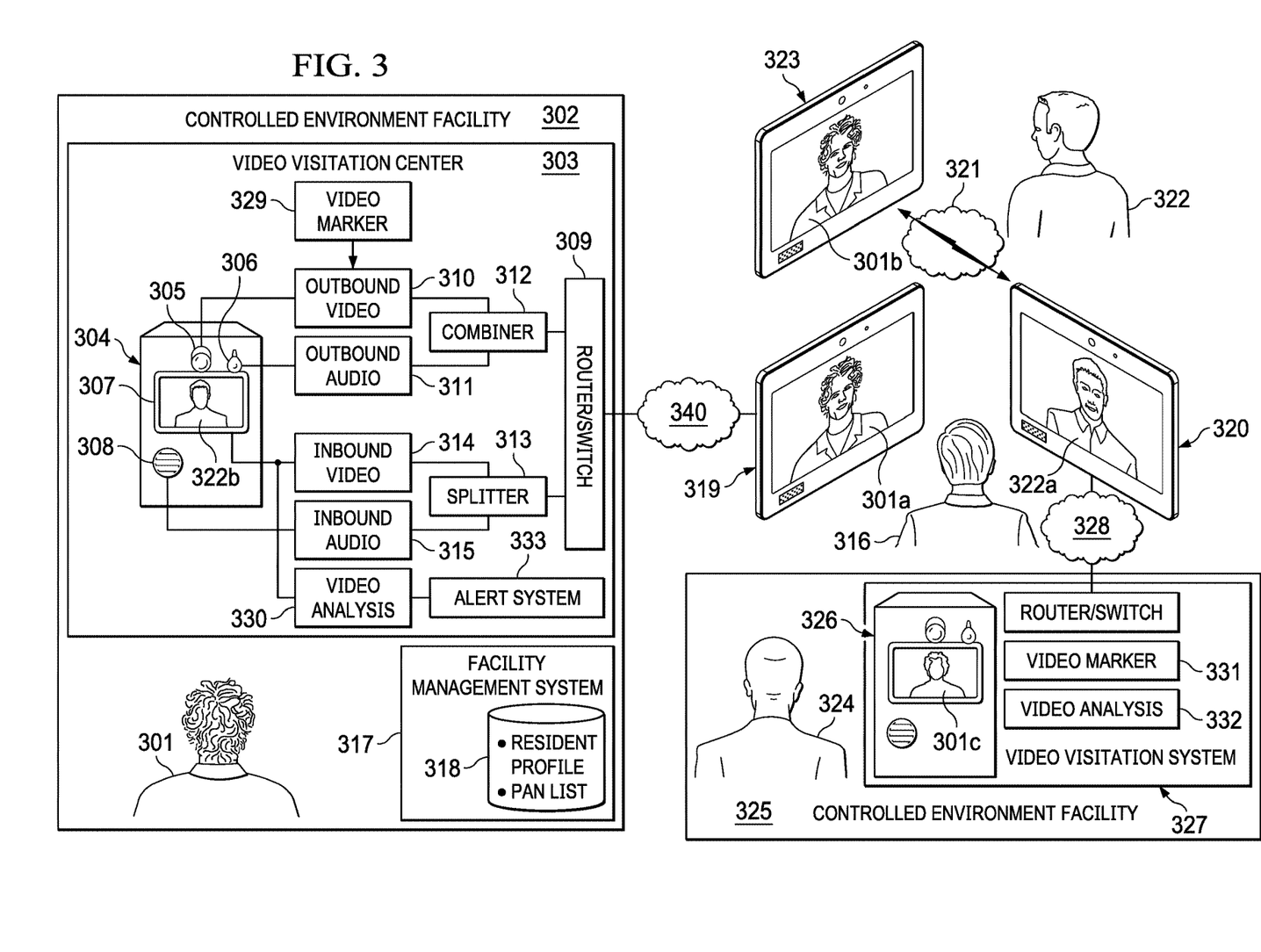
FIG. 3 is simplified block diagram illustrating a video visitation system for a controlled-environment facility in which two video conferencing sessions are manually linked together in a three-way video conferencing session.

FIG. 3 is simplified block diagram illustrating a video visitation system for a controlled-environment facility in which two video conferencing or video chat sessions are manually linked together in a three-way video conferencing session. Resident 301 is located in controlled environment facility 302. Video visitation system 303 allows residents to communicate with family, friends, attorneys, and others outside the controlled environment facility 302. Resident visitation terminal 304 provides the user interface for video visitation system 303. Resident visitation terminal 304 has a camera 305 for capturing video or still images of resident 301 and a microphone 306 for capturing audio from resident 301. Incoming video and images from remote participants are presented on display 307 and incoming audio is played through speaker 308. A router or switch 309 connects the video visitation system 303 to networks 340 to support communications with remote participants. Video captured by camera 305 is processed by outbound video circuit 310, and audio captured by microphone 306 is processed by outbound audio circuit 311. Combiner circuit 312 combines the video and audio information into the appropriate format for transmission to remote videoconferencing participants across network 340. Incoming videoconference information from network 340 is received at router or switch 309 and routed to splitter 313, which provides inputs to inbound video circuit 314 and inbound audio circuit 315. The incoming video and audio signals are then broadcast to resident 301 using display 307 and speaker 308, respectively.

Video visitation system 303 may provide authentication and authorization services while establishing new video conferencing sessions. For example, when resident 301 initiates a new video conference session to a called party 316, video visitation system 303 may access a facility management system 317 to authenticate resident 301 and to verify that resident 301 is authorized to contact called party 317. Facility management system 317 may be a jail management system (JMS) or a law enforcement agency management system (AMS) associated with the controlled-environment facility 302 that has data about the residents. Facility management system 317 has a database 318 comprising resident profile data, which may include a personal allowed numbers (PAN) list, a whitelist, or a blacklist that identifies allowed and/or restricted contacts for the user. The contacts listed in the resident's profile may identify particular individuals, devices, and/or telephone numbers/addresses that resident 301 is allowed to contact or restricted from contacting. If the designated called party 316 or called device 319 is authorized for resident 301, then video visitation system 303 will establish a video conference session between resident visitation terminal 304 and called device 319 thereby allowing resident 301 and called party 316 to communicate.

It will be understood that in other embodiments, the remote party 316 may initiate a video visitation session by calling video visitation system 303 at controlled-environment facility 302, which will verify authentication and authorization before establishing the video conference session. Furthermore, it will be understood that video visitation system 303 and the embodiments disclosed herein may be compatible with any now known or later developed standard, protocol, or codec, such as, for example, Session Initiation Protocol (SIP), H.323, International Telecommunication Union's (ITU) H.264, VP8, Real-Time Video codec, WebRTC, or Object Real-Time Communications (ORTC).

As noted in reference to FIG. 2, problems can arise if called party 316 facilitates a three-way video conference call. Called party 316 may use a second device 320 to establish a second video conference session across network 321 to third party 322 at device 323. By holding devices 319 and 320 face-to-face, called party 316 can allow resident 301 to communicate directly with third party 322. The image 301a of resident 301 as displayed on device 319 is relayed as image 301b on device 323 along with the audio from resident 301. Similarly, the image 322a of third-party 322 on device 320 is relayed to the video visitation system 303 and displayed as image 322b to resident 301 along with audio from third party 322.

FIG. 3 further illustrates a second three-way video conference session embodiment in which the remote third-party resident 324, who is located at controlled-environment facility 325 and using resident visitation terminal 326 on video visitation system 327. Instead of establishing a second video conferencing session with third party 322, called party 316 may have established the second video conferencing session via network 328 with resident 324. It is very unlikely that residents 301 and 324 should be allowed to communicate with each other if they are in restricted facilities such as jails or prisons. However, called party 316 could allow resident 301 to communicate directly with resident 324 by holding devices 319 and 320 face-to-face. This would allow video (301c) and audio from resident 301 to be broadcast on resident visitation terminal 326. Similarly, images 322a, 322b would represent video of resident 324 that was relayed to resident 301.

Absent additional protections or processing, video visitation system 303 itself would be unaware of the second video conferencing session between called party 316 and third party 322 and would not know that called party 316 has linked the two video conferencing sessions. Since a controlled-environment facility may have a large number of video visitation sessions for different residents running concurrently, and given that a three-way video conference session could be established at any time on any of those resident sessions, it would be helpful to automate detection of such three-way video conference sessions so that the facility 302 does not have to manually monitor all sessions at all times.

In one embodiment, the video visitation system marks the outbound video signal with a cue, which is then transmitted to the remote video conferencing participant with the session data. The video visitation system analyzes inbound video conferencing signals to detect if a video cue is present. If the video cue is detected, then the video visitation session may be flagged for further analysis or an alert may be generated to notify an investigator that a possible three-way visitation session is in progress. Referring to FIG. 3, in video visitation system 303, video marker circuit 329 inserts a video cue into the outbound video data. The video cue is a visible or invisible marking or feature that has been added to the content that is to be displayed by the device receiving the outbound video data. For inbound video signals, a video analysis circuit 330 processes the received/detected video content and looks for the video cue. In video visitation system 327, video marker circuit 331 inserts a video cue into the outbound video data, and video analysis circuit 332 processes the received video content and looks for the video cue.

If a three-way video visitation session has been established by called party 316, the video cue added by video marker circuit 331 will be passed to called device 320 and displayed to second device 319 along with resident image 322a. The video cue is captured along with resident image 322a and passed to video visitation system 303. Incoming video at video visitation system 303 is displayed as image 322b to resident 301. Video analysis circuit 330 further processes the incoming video and searches for the video cue. Video visitation sessions for controlled-environment facility 302 may be recorded. If the video cue is detected, then alert system 333 is notified to flag the video session recording for further review and/or to alert an investigator or facility staff that a three-way visitation session is in progress. Alert system 333 may take further action, such as terminating the video visitation session, if the video cue is detected. Controlled-environment facilities 302, 325 may be the same or separate facilities. If they are the same facility, then video marker components 329, 331 may be the same device, and video analysis components 330, 332 may be the same device within the same video visitation system 303, 327. Each video visitation system 303, 327 may serve multiple resident visitation terminals 304, 326 at each location.

It will be understood that the components of video visitation systems 303, 327 may be any appropriate devices for processing video conferencing session data and related video and audio content. Outbound video circuit 310, outbound audio circuit 311, combiner circuit 312, splitter 313, inbound video circuit 314, inbound audio circuit 315, video marker circuit 329, video analysis circuit 330, video marker circuit 331, and video analysis circuit 332 may be separate, discrete circuits or one or more of the components may be combined in the same device. The components may be discrete analog circuits, general use processors running specialized software applications, or specialized digital circuits or processors designed to perform the functions related to processing video conferencing session data and related video and audio content.

The video cue may be any unique video signal, image, or artifact that can be added to the outbound video data so that the video cue will be displayed at a receiving device. The video cue may be invisible to the video visitation participants or may be detectable by human vision. For example, video cues with a frequency or wavelength outside the range of visible light, such as infrared or ultraviolet cues, may be added to the outbound video signal. Alternatively, the video cue may be a visible mark that is noticeable or unnoticeable to video conferencing session participants. Noticeable signals in the range of visible light, such as visible watermarks, tags, or labels, may be used. For example, if the outbound video signals were marked with the name of the originating controlled-environment facility, then the video analysis circuits would look for such names in incoming video. Unnoticeable or less obvious cues in the range of visible light, such as inconspicuous, muted, or unobtrusive marks, may also be used. For example, patterns of light flashes or screen blinking (e.g., turned off/on, image replaced by a white or black screen, etc.) could be used as a video cue. The video cue may be positioned at a particular location in the video display, such as in a designated corner or edge, or may take over a portion of the display or the entire display. The video cue may be a one-time event during a session or, depending upon the format of the cue, may occur at regular, irregular, or random intervals. Generally, a more unique video cue (e.g., specific shapes or text) can occur at more random or infrequent intervals if it is easier to detect compared to random events. However, more generic video cues (e.g., light pulses or screen blinking) are more likely to require pairing to some regular or predictable intervals to improve detection. Such intervals may be, for example, at set periods of time (e.g., every X minutes or seconds), at times established relative to the start of a video conference (e.g., at specific time(s) after the start of the session), or at times based upon a common clock (e.g., at the start of every hour on a local or world (GMT) clock).

In some embodiments, if video analysis circuit 330 detects the video cue, inbound video circuit 314 may further process the image 322b to be shown on display 307 to remove the video cue. This would prevent resident 301 from detecting the video cue, which would eliminate warning resident 301 of a possible detection of the three-way video visitation session.

Figure 4:
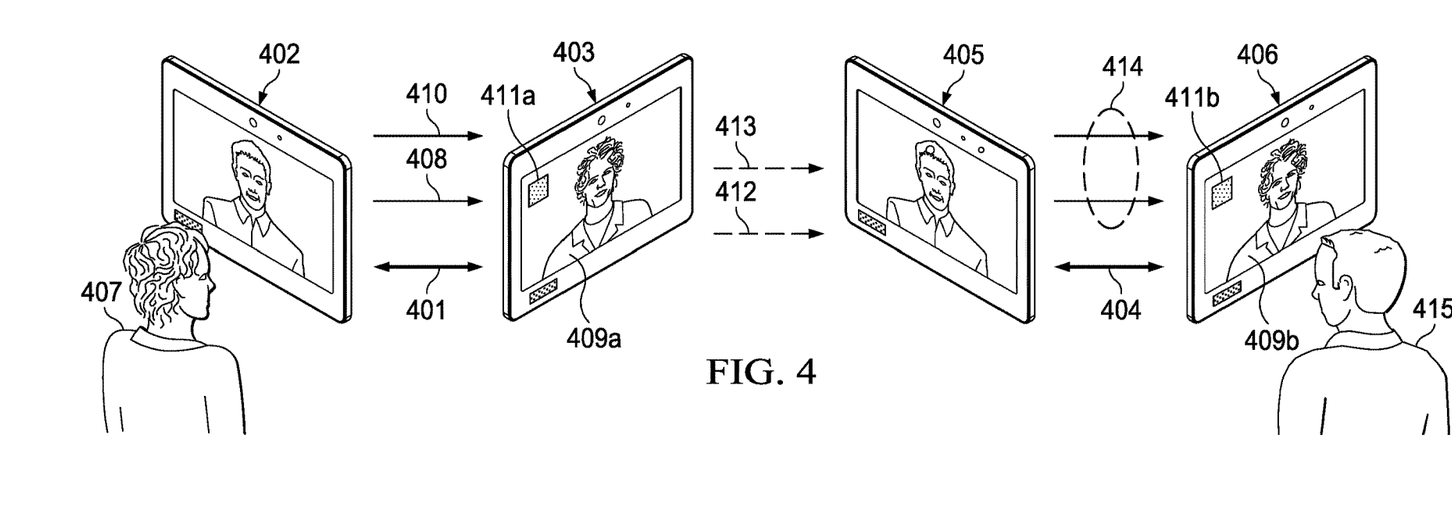
FIG. 4 illustrates transmission of participant video and video cues in a three-way video conference session.

FIG. 4 illustrates transmission of participant video and video cues in a three-way video conference session. A first video conferencing session 401 is established between devices 402 and 403, and a second video conferencing session 404 is established between devices 405 and 406. These sessions are joined into a three-way video conference session by positioning devices 403 and 405 so that they capture the other device's video display, such as by holding the devices face-to-face. Video of participant 407 is captured by device 401 and transmitted as video content (408) over session 401 to be displayed on device 403 as image 409a. Device 402 also adds video cue 410 to the outbound video content in session 401. Video cue 410 may appear as visible or invisible mark 411a when the video content is displayed on device 403. When device 405 captures (412) image 409a, it also captures (413) video cue 411a. The image 409a and video cue 411a may be captured by a camera on device 405 that is focused on the display of device 403.

Both image 409a and video cue 411a are transmitted together (414) as video content in over video conferencing session 404 to device 406. Without further processing, device 406 would display both participant image 409b and video cue 411b as captured from the display on device 403. Device 406 may further analyze the incoming video content 414 to search for and extract video cue 411b. Should video cue 411b be detected, then device 406 can take appropriate action, such as flagging the session for further review, alerting an investigator of the three-way session, and/or terminating session 404. Device 406 may further process the incoming video content 414 to remove video cue 411b so that only participant image 409b is displayed to remote party 415.

Figure 5:
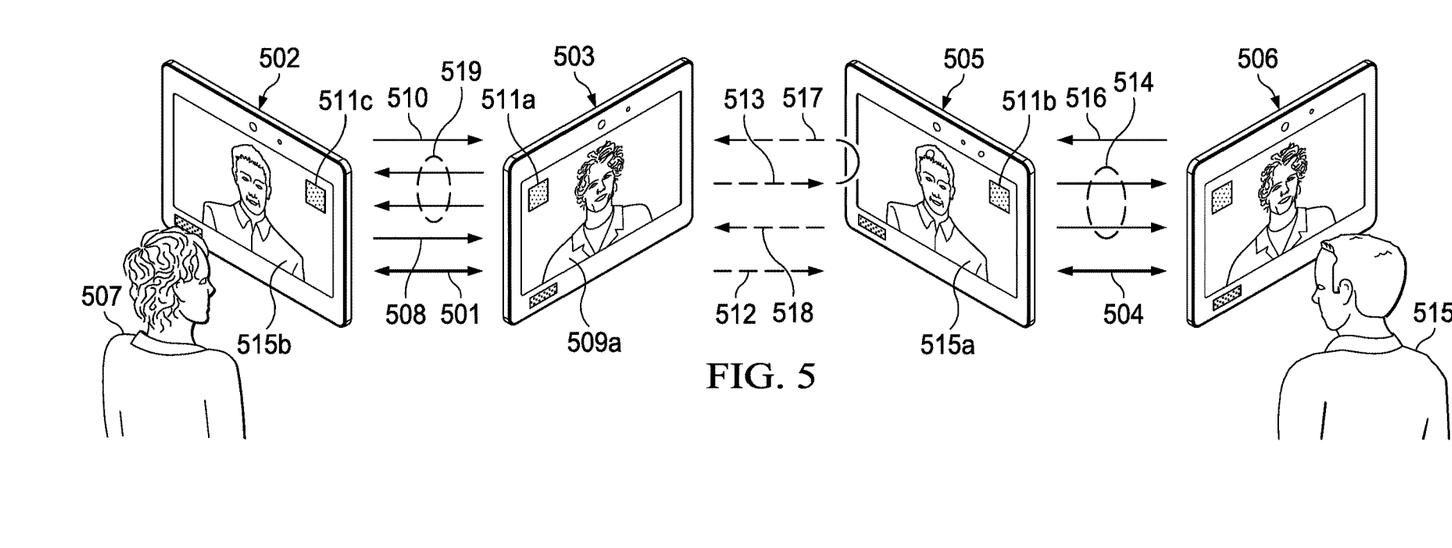
FIG. 5 illustrates detection of video cues by the originating device in a three-way video conference session.

FIG. 5 illustrates detection of video cues by the originating device in a three-way video conference session. It may be possible for a device that originates the video cue to also detect the video cue, such as in a reflection from the second half of the three-way video conference session. A first video conferencing session 501 is established between devices 502 and 503, and a second video conferencing session 504 is established between devices 505 and 506. These sessions are joined into a three-way video conference session by positioning devices 503 and 505 so that they capture the other device's video display, such as by holding the devices face-to-face. Video of participant 507 is captured by device 501 and transmitted as video content (508) over session 501 to be displayed on device 503 as image 509a. Device 502 also adds video cue 510 to the outbound video content in session 501. Video cue 510 may appear as visible or invisible mark 511a on the display of device 503. When device 505 captures (512) image 509a, it also captures (513) video cue 511a. Both image 509a and video cue 511a are transmitted together as video content (514) to device 506 over video conferencing session 504. Device 506 may detect the video cue as described with respect to FIG. 4.

Device 506 captures video of participant 515, which is transmitted as video content (516) over session 504 to be displayed on device 505 as image 515a. The display (e.g., screen) and case on device 505 has some degree of reflectivity, which may vary depending upon the material used to manufacture the display screen and case of device 505. Depending upon the reflectivity of device 505 and the strength (i.e., brightness) of video cue 511a that is being displayed on device 503, an image of the video cue may be reflected (517) from the display or case of device 505. The video cue reflection 511b on the display of device 505 may be captured (517, 518) by device 503 along with the image 515a of participant 515 as displayed on device 505. Device 503 transmits both image 515a and the reflected video cue 511b together as video content (519) over video conferencing session 501 to device 502. Device 502 analyzes the incoming video content 519 to search for video cue 511b. Should video cue 511b be detected, then device 502 can take appropriate action, such as flagging the session for further review, alerting an investigator of the three-way session, and/or terminating session 501. Device 502 may further process the incoming video content 519 to remove video cue 511b so that only remote party image 515b is displayed to participant 507. Alternatively, device 502 may display both the remote party image 515b and video cue 511c that were captured from device 505.

Although the video conferencing sessions illustrated herein are two-party sessions, it will be understood that any number of parties may be a participant to the separate video conferencing sessions that are joined into a three-way session. For example, any one or more of video conferencing sessions 401, 404, 501, and/or 504 may involve two or more parties (e.g., session 401 may be a multi-party teleconference, and session 404 may be a separate multi-party teleconference).

Figure 6:
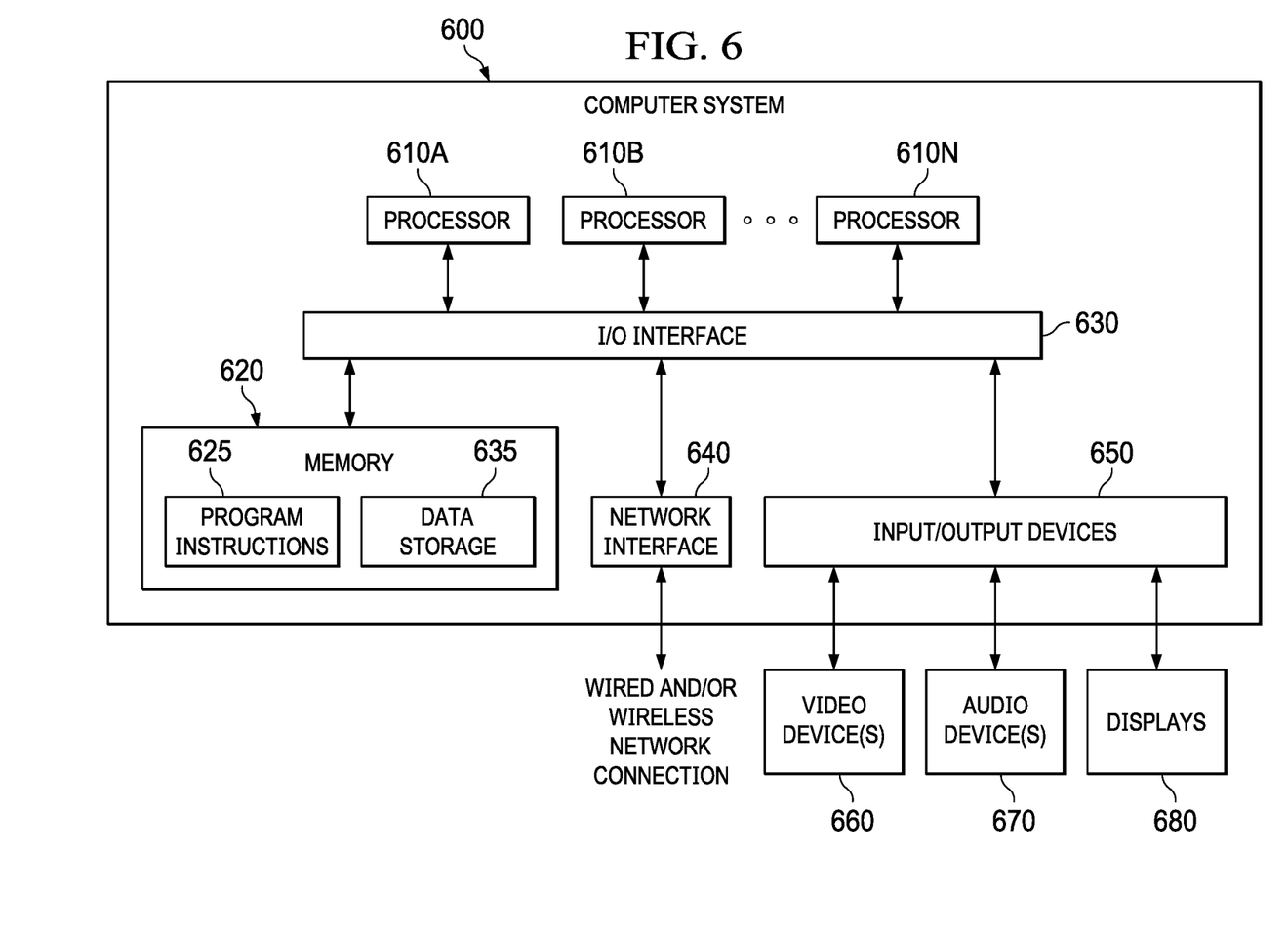
FIG. 6 is a block diagram of a computer system, device, station, or terminal configured to implement various techniques disclosed herein, according to some embodiments.

Embodiments of the present systems and methods for detection of three-way video conference sessions, as described herein, may be implemented or executed, at least in part, by one or more computer systems. One such computer system is illustrated in FIG. 6. In various embodiments, computer system 600 may be a server, a mainframe computer system, a workstation, a network computer, a desktop computer, a laptop, a tablet computing device, smartphone, media player, or the like. For example, in some cases, computer 600 may be used as, or as part of, one or more of video conferencing devices 103, 104, 203, 204, 208, 209, 319, 320, 323, 402-406, or 502-506 or video visitation systems 303, 327, and/or the like. In various embodiments two or more of these computer systems may be configured to communicate with each other in any suitable way, such as, for example, via a network (e.g., via networks 110, 206, 211, 340, 321, or 328).

As illustrated, example computer system 600 includes one or more processors 610 coupled to a system memory 620 via an input/output (I/O) interface 630. Example computer system 600 further includes a network interface 640 coupled to I/O interface 630, and one or more input/output devices 650, such as video device(s) 660 (e.g., a camera), audio device(s) 670 (e.g., a microphone and/or a speaker), and display(s) 680. Computer system 600 may also include a cursor control device (e.g., a mouse or touchpad), a keyboard, etc. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In various embodiments, computer system 600 may be a single-processor system including one processor 610, or a multi-processor system including two or more processors 610 (e.g., two, four, eight, or another suitable number). Processors 610 may be any processor capable of executing program instructions. In multi-processor systems, each of processors 610 may commonly, but not necessarily, implement the same architecture. Also, in some embodiments, at least one processor 610 may be a graphics processing unit (GPU) or other dedicated graphics-rendering device.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-readable medium may include any tangible or non-transitory storage media or memory media such as magnetic or optical media—e.g., disk or CD/DVD-ROM coupled to computer system 600 via I/O interface 630, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 640.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any suitable protocol, timing or other data transformations to convert data signals from one component (e.g., system memory 620) into a format usable by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments, some or all of the functionality of I/O interface 630, such as an interface to system memory 620, may be incorporated into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 6, memory 620 may include program instructions 625, configured to implement certain embodiments described herein, and data storage 635, comprising various data accessible by program instructions 625. In an embodiment, program instructions 625 may include software elements corresponding to one or more of the various embodiments illustrated in the above figures. For example, program instructions 625 may be implemented in various embodiments using any desired programming language, scripting language, or combination of programming languages and/or scripting languages. Data storage 635 may include data that may be used in these embodiments. In other embodiments, other or different software elements and data may be included.

An example method for three-way video visitation detection using video cues comprises establishing a video conferencing session between a first device and a second device.

The first and/or second devices may be any mobile, portable, or fixed communication device that is capable of capturing video images of a user and presenting received video to the user. The method for three-way video visitation detection further comprises extracting video content from video conferencing session data received at the first device from the second device. The method for three-way video visitation detection further comprises identifying one or more known cues that have been added to the video content, wherein the known cues identify a third device as a source of the video content. In this scenario, video content originates at the third device, which adds the known cue to transmitted video content. The second device captures the video content and known cue as it is displayed on a receiving device, and the second device relays the video content and known cue to the first device, which detects the known cue.

The example method may further comprise adding cues to outbound video content prior to transmission as video conferencing session data, wherein the added cues identify the first device as a source of the transmitted video conferencing session data.

The example method may further comprise generating an alert, terminating the video conferencing session, and/or flagging a video conferencing session record for further analysis when a known cue has been identified in the video information.

The example method may further comprise removing the known cues from the received video content; and displaying the received video content without displaying the known cues to a user. The known cue may or may not be detectable by human vision. The known cue may be a pattern of light flashes or screen blinking. The known cue may occur at regular, irregular, or random intervals.

Another example method for three-way video visitation detection using video cues comprises establishing a video conferencing session between a first device and a second device; adding known cues to outbound video content information at the first device prior to transmission as video conferencing session data to the second device; extracting video content information at the first device from video conferencing session data received from the second device; and identifying one or more known cues that have been added to the video content information, wherein the known cues originated at the first device. In this scenario, the first device adds the known cue to transmitted video and then detects that same known cue in received video content, which indicates that the outgoing video may have been reflected and recaptured when the outgoing video was displayed at the second device.

The example method may further comprise generating an alert, terminating the video conferencing session, or flagging a video conferencing session record for further analysis when a known cue has been identified in the video information. The example method may further comprise removing the known cues from the video content information; and displaying the video content information to a user without the known cues.

An example video conferencing system comprises inbound video circuitry configured to extract video content information from received video conferencing session data; and video analysis circuitry configured to identify known cues in the video content information, wherein the known cues identify a source of the received video content. The video conferencing system may further comprise outbound video circuitry configured to add cues to outbound video content information prior to transmission as video conferencing session data, wherein the added cues identify a source of the transmitted video conferencing session data.

The video conferencing system may further comprise an alert system configured to perform one or more of: generating an alert when a known cue has been identified in the video information; terminating the video conferencing session when a known cue has been identified in the video information; and flagging a video conferencing session record for further analysis when a known cue has been identified in the video information.

A person of ordinary skill in the art will appreciate that computer system 600 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

What is claimed is:
1. A method, comprising:
 establishing a video conferencing session between a first device and a second device;
 adding cues to outbound video content prior to transmission as video conferencing session data, the added cues identifying the first device as a source of transmitted video content;
 extracting video content information from video conferencing session data received from the second device; and
 identifying one or more known cues that have been added to the video content, wherein the known cues identify a third device, which is not a part of the video conferencing session, as a source of the video content.
2. The method of claim 1, further comprising;
 generating an alert when a known cue has been identified in the video information.

3. The method of claim 1, further comprising;
terminating the video conferencing session when a known cue has been identified in the video information.

4. The method of claim 1, further comprising;
flagging a video conferencing session record for further analysis when a known cue has been identified in the video content.

5. The method of claim 1, further comprising;
removing the known cues from the video content; and
displaying the video content without the known cues to a user.

6. The method of claim 1, wherein the known cue is not detectable by human vision.

7. The method of claim 1, wherein the known cue is a pattern of light flashes or screen blinking.

8. The method of claim 1, wherein the known cue occurs at regular intervals.

9. The method of claim 1, wherein the known cue occurs at irregular intervals.

10. The method of claim 1, wherein the known cue occurs at random intervals.

11. A method, comprising:
establishing a video conferencing session between a first device and a second device;
adding known cues to outbound video content information at the first device prior to transmission as video conferencing session data;
extracting video content information from video conferencing session data received from the second device; and
identifying one or more known cues that have been added to the video content, wherein the known cues originated at the first device.

12. The method of claim 11, further comprising;
generating an alert when a known cue has been identified in the video content.

13. The method of claim 11, further comprising;
terminating the video conferencing session when a known cue has been identified in the video content.

14. The method of claim 11, further comprising;
flagging a video conferencing session record for further analysis when a known cue has been identified in the video content.

15. The method of claim 11, further comprising;
removing the known cues from the video content; and
displaying the video content without the known cues to a user.

16. A video conferencing system, comprising:
outbound video circuitry configured to add cues to outbound video content information prior to transmission as video conferencing session data, the added cues identifying a source of the transmitted video content;
inbound video circuitry configured to extract video content information from received video conferencing session data; and
video analysis circuitry configured to identify known cues that have been added to the video content, wherein the known cues identify a source, which is not a part of the video conferencing session, of the received video content.

17. The video conferencing system of claim 16, further comprising:
an alert system configured to perform one or more of the following when a known cue has been identified in the video content: generate an alert; terminate the video conferencing session; and flag a video conferencing session record for further analysis.

* * * * *